(12) United States Patent
Tian et al.

(10) Patent No.: US 12,088,214 B2
(45) Date of Patent: Sep. 10, 2024

(54) POWER SUPPLY CONVERSION DEVICE AND CHARGING CONTROL METHOD

(71) Applicant: GUANGDONG OPPO MOBILE TELECOMMUNICATIONS CORP., LTD., Guangdong (CN)

(72) Inventors: Chen Tian, Guangdong (CN); Jialiang Zhang, Guangdong (CN); Chen Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 115 days.

(21) Appl. No.: 17/931,206

(22) Filed: Sep. 12, 2022

(65) Prior Publication Data

US 2023/0006570 A1 Jan. 5, 2023

Related U.S. Application Data

(63) Continuation of application No. PCT/CN2021/078577, filed on Mar. 2, 2021.

(30) Foreign Application Priority Data

Mar. 12, 2020 (CN) .......................... 202010172276.3

(51) Int. Cl.
*H02M 7/217* (2006.01)
*H02J 7/04* (2006.01)
*H02M 1/42* (2007.01)

(52) U.S. Cl.
CPC ............. *H02M 7/2176* (2013.01); *H02J 7/04* (2013.01); *H02M 1/4258* (2013.01); *H02J 2207/20* (2020.01)

(58) Field of Classification Search
CPC .............. H02M 7/2176; H02M 1/4258; H02J 2207/20; H02J 7/04
See application file for complete search history.

(56) References Cited

U.S. PATENT DOCUMENTS

2008/0239765 A1 10/2008 Popescu et al.
2013/0069733 A1 3/2013 Calmel et al.
(Continued)

FOREIGN PATENT DOCUMENTS

CN 1866704 11/2006
CN 101286650 10/2008
(Continued)

OTHER PUBLICATIONS

CNIPA, First Office Action for CN Application No. 202010172276.3, Jan. 18, 2022.
(Continued)

*Primary Examiner* — Sisay G Tiku
(74) *Attorney, Agent, or Firm* — Hodgson Russ LLP

(57) ABSTRACT

Provided are a power supply conversion device and a charging control method. The device includes: a transformer; a first rectifier circuit connected to a primary winding of the transformer, for converting a received alternating current into a first direct current, a voltage value of the first direct current being a first direct-current voltage, and the transformer is used for converting the first direct-current voltage into a second direct-current voltage; a voltage converter connected to a secondary winding of the transformer, for converting the second direct-current voltage to output a constant direct-current voltage or a pulsating direct-current voltage; and a controller connected to the first rectifier circuit and the voltage converter, for controlling the voltage converter to selectably output the constant direct-current
(Continued)

voltage or the pulsating direct-current voltage according to a desired charging mode of a device to be charged.

18 Claims, 6 Drawing Sheets

(56) References Cited

U.S. PATENT DOCUMENTS

| | | | | |
|---|---|---|---|---|
| 2014/0103863 | A1* | 4/2014 | Fassnacht | H02M 7/217 320/107 |
| 2015/0043253 | A1* | 2/2015 | Awane | H02M 5/4585 363/126 |
| 2017/0229877 | A1* | 8/2017 | Zhang | H01M 10/0525 |
| 2018/0074564 | A1 | 3/2018 | Paparrizos et al. | |
| 2019/0273442 | A1* | 9/2019 | Tian | H02H 9/00 |
| 2019/0273443 | A1* | 9/2019 | Tian | H02M 7/04 |
| 2019/0280515 | A1* | 9/2019 | Tian | H02J 7/007 |
| 2022/0311347 | A1* | 9/2022 | Tian | H02M 1/0009 |
| 2023/0006462 | A1* | 1/2023 | Jiang | H02M 3/005 |
| 2023/0170783 | A1* | 6/2023 | Tian | H02M 1/007 363/17 |
| 2023/0198371 | A1* | 6/2023 | Tian | H02J 7/00711 363/17 |

FOREIGN PATENT DOCUMENTS

| | | | | |
|---|---|---|---|---|
| CN | 101399498 | | 4/2009 | |
| CN | 101414764 A | | 4/2009 | |
| CN | 101465609 | | 6/2009 | |
| CN | 104993728 | | 10/2015 | |
| CN | 106026327 | | 10/2016 | |
| CN | 106230282 | | 12/2016 | |
| CN | 205882810 | | 1/2017 | |
| CN | 107979150 | | 5/2018 | |
| CN | 108832822 | | 11/2018 | |
| CN | 208174332 | | 11/2018 | |
| CN | 105553001 | | 4/2019 | |
| CN | 110417101 | | 11/2019 | |
| CN | 109845082 B | * | 1/2021 | G05F 1/10 |
| CN | 109804541 B | * | 5/2021 | H02J 7/00034 |
| CN | 109804542 B | * | 6/2021 | H02J 7/007 |
| CN | 108141058 B | * | 3/2022 | G01R 31/2874 |
| CN | 109874364 B | * | 1/2023 | G05F 1/56 |
| EP | 3569441 A1 | * | 11/2019 | B60L 53/18 |
| JP | 2012010528 | | 1/2012 | |
| TW | 201804275 A | * | 2/2018 | G01R 31/2874 |

OTHER PUBLICATIONS

WIPO, International Search Report and Written Opinion for PCT/CN2021/078577, May 27, 2021.
CNIPA, Second Office Action for CN Application No. 202010172276.3, Nov. 2, 2022.
CNIPA, Notification to Grant Patent Right for Invention for CN Application No. 202010172276.3, May 17, 2023.
EPO, Extended European Search Report for EP Application No. 21768117.0, Jul. 17, 2023.

* cited by examiner

POWER SUPPLY CONVERSION DEVICE AND CHARGING CONTROL METHOD

CROSS REFERENCE OF RELATED APPLICATIONS

This application is a continuation of International Application No. PCT/CN2021/078577, filed Mar. 2, 2021, which claims priority to Chinese Patent Application No. 202010172276.3, filed Mar. 12, 2020, the entire disclosures of which are incorporated herein by reference.

TECHNICAL FIELD

The disclosure relates to the field of power charging technologies, and more particularly to a power supply conversion device and a charging control method.

BACKGROUND

An alternating current to direct current (AC-DC) power supply device is used to convert an alternating current into a direct current, and is widely applied to power supply adapters of mobile electronic devices such as mobile phones. The miniaturization of AC-DC power supply device is one of mainstream development directions in the industry. For example, a small-size power supply adapter has a high portability and a better user experience.

SUMMARY

The disclosure provides a power supply conversion device and a charging control method.

In an aspect of the disclosure, a power supply conversion device as provided may include: a transformer, a first rectifier circuit, a voltage converter (also referred to as voltage conversion module), and a controller (also referred to as control unit). The first rectifier circuit is connected to a primary winding of the transformer and configured (i.e., structured and arranged) to convert a received alternating current into a first direct current in which a voltage value of the first direct current is a first direct-current voltage. The transformer is configured to convert the first direct-current voltage into a second direct-current voltage. The voltage conversion module is connected to a secondary winding of the transformer, and configured to convert the second direct-current voltage and output a constant direct-current voltage or a pulsating direct-current voltage. The control unit is connected to the first rectifier circuit and the voltage conversion module individually, and configured to control, based on a desired charging mode of a device to be charged connected to the power supply conversion device, the voltage conversion module to output a corresponding one of the constant direct-current voltage and the pulsating direct-current voltage.

In another aspect of the disclosure, a charging control method applied to a power supply conversion device may include: converting a received alternating current into the first direct current at a primary side of a transformer by a first rectifier circuit; where a voltage value of the first direct current is a first direct-current voltage; converting the first direct-current voltage into a second direct-current voltage by the transformer; converting the second direct-current voltage at a secondary side of the transformer by a voltage conversion module for outputting a constant direct-current voltage or a pulsating direct-current voltage; and controlling, by a control unit based on a desired charging mode of a device to be charged connected to the power supply conversion device, the voltage conversion module to output a corresponding one of the constant direct-current voltage and the pulsating direct-current voltage.

DETAILED DESCRIPTION OF EMBODIMENTS

Figure 1:
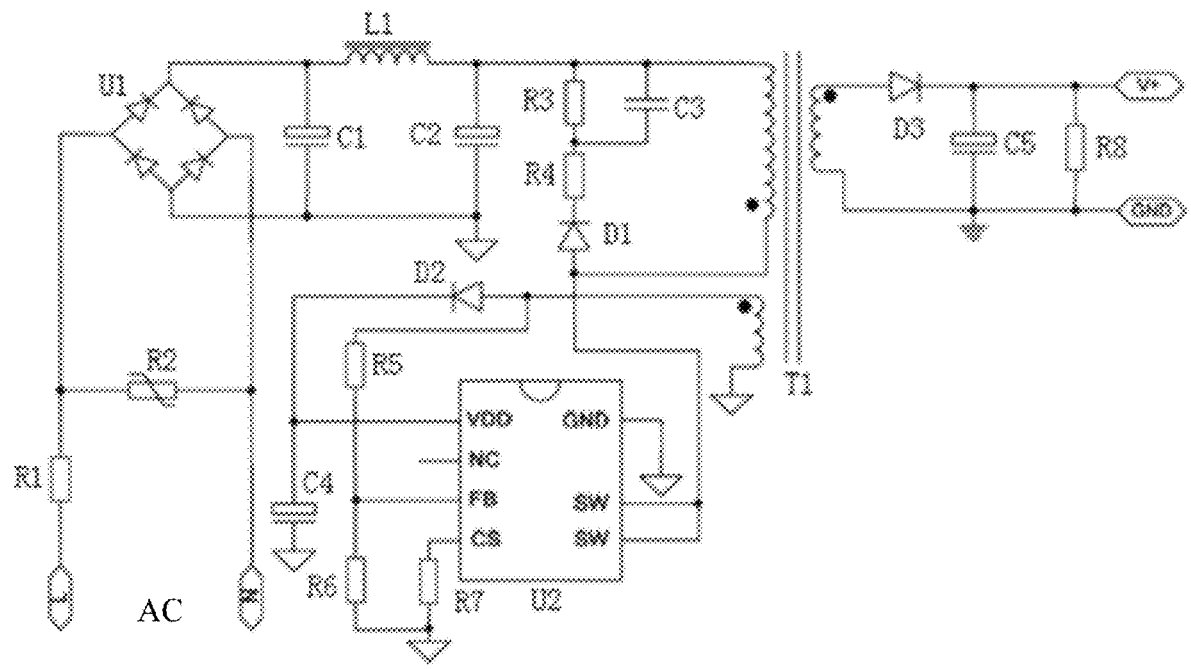
FIG. 1 illustrates a schematic circuit diagram of an alternating current to direct current (AC-DC) power supply device in the related art according to an example.

Illustrative embodiments will be described more fully with reference to the accompanying drawings. However, the illustrative embodiments may be implemented in various forms, and should not be construed as limited to the embodiments set forth herein; rather, providing these embodiments allows the disclosure more comprehensive and complete, and comprehensively convey the concept of the illustrative embodiments to those skilled in the art. The described features, structures, or characteristics may be combined in any suitable manner in one or more embodiments.

In addition, the accompanying drawings are only schematic illustrations of the disclosure and are not necessarily drawn to scale. Identical reference numerals in the drawings represent identical or similar parts, and thus repetitive descriptions thereof will be omitted. Some of block diagrams shown in the drawings are functional entities and do not necessarily correspond to physically or logically independent entities. These functional entities may be implemented in that form of software, in one or more hardware modules, integrated circuits, or in at least one of different networks, processor devices and microcontroller devices.

In the disclosure, unless otherwise expressly defined and limited, terms "coupled", "connected", and other terms should be construed in a broad sense, for example, they can be mechanically connected, electrically connected, or mutual communication; it can be directly connected, or indirectly connected through an intermediate medium, or it can be internal connection of two components or interaction relationship between two components. For those skilled in the art, the specific meaning of the above terms in the disclosure can be understood according to the specific circumstances.

FIG. 1 illustrates a schematic circuit diagram of an alternating current to direct current (AC-DC) power supply device in the related art according to an example. As shown in FIG. 1, an AC is input through an AC terminal. Taking the city power (also referred to as city electric supply, or commercial power) with AC of 220 voltages per 50 Hertz (220V/50Hz) as an example, an input AC waveform is 220 V sine wave. Through a full bridge rectifier U1 composed of four diodes, the input AC is rectified and a steamed bread wave (also referred to as a full-wave rectified wave) is output. A primary winding of a transformer T1 is connected to switching pins SW of a switching power supply chip U2. The switch pins SW output a high-frequency pulse width modulation (PWM) square wave, which is used to modulate the steamed bread wave output by the full bridge rectifier U1. The feedback is obtained by a separate winding and input to a feedback pin FB of the switching power supply chip U2, so that an output voltage on a secondary side is stable.

As shown in FIG. 1, the primary side of the transformer T1 includes a capacitor C1 for energy storage. Since a voltage at the primary side of the transformer T1 is very high, a liquid electrolytic capacitor with a high-voltage resistance is usually selected as an energy storage capacitor. A capacitance value and a size of the liquid electrolytic capacitor are relatively large, resulting in low power density of the power supply device; and the larger the output power is, the larger the capacitance value and the size is, affecting the size of the power supply conversion device, which is not convenient to carry around, and the user experience is poor. In addition, the liquid electrolytic capacitor has a short service life and is prone to bursting, making a service life of the power supply conversion device is short and safety is poor.

Moreover, as people's demand for charging increases, the industry has successively proposed high-current fast charging schemes and high-voltage fast charging schemes on the basis of ordinary charging. Among them, the high-current charging scheme may charge a battery in an electronic device through a pulsating DC voltage output by a power supply adapter, while the high-voltage charging scheme, such as the power delivery (PD) protocol published by the Universal Serial Bus Implementers Forum, Inc. (USB-IF), increases a charging power by increasing a charging voltage, so as to speed up a charging rate. According to requirements of PD protocol, an output voltage of the adapter must be a constant DC voltage, if the output voltage of the adapter drops below a preset threshold, the electronic device considers the charging abnormal and terminates the charging of the battery.

Therefore, as mentioned above, how to improve the power density of the power supply adapter and be compatible with different types of fast charging protocols at the same time, so as to improve the compatibility and adaptability of the power supply adapter, has become a technical problem that needs to be solved.

A power supply conversion device provided by an embodiment of the disclosure adopts a two-stage structure, only an AC-DC conversion is performed on a primary side of a transformer, and a circuit including DC-DC DC output adjustment part is disposed on a secondary side of the transformer, so that a large-size electrolytic capacitor is not required to be disposed on the primary side of the transformer. In addition, a control unit negotiates a charging mode by communicating with a connected device to be charged, and adjusts an input current of an AC-DC rectifier according to the negotiated charging mode, so that a DC-DC converter can output a constant DC voltage or a pulsating DC voltage accordingly, which is compatible with different charging modes.

Hereinafter, a power supply conversion device and a charging control method in the illustrative embodiments of the disclosure will be described in more detail with reference to the accompanying drawings and embodiments.

Figure 2:
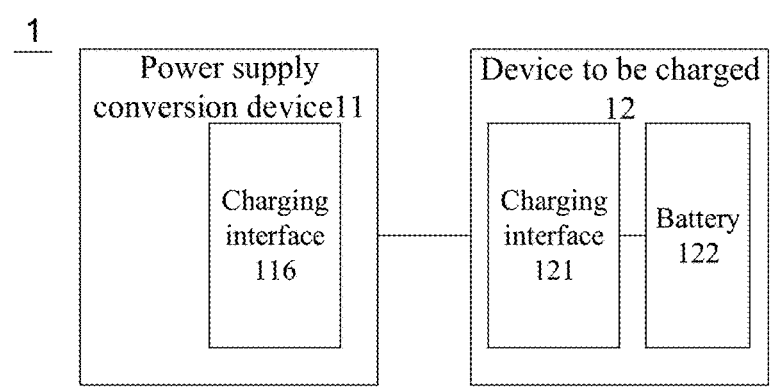
FIG. 2 illustrates a schematic diagram of a charging system according to an illustrative embodiment.

FIG. 2 illustrates a schematic diagram of a charging system according to an illustrative embodiment.

As shown in FIG. 2, the charging system 1 includes a power supply conversion device 11 and a device to be charged 12.

The power supply conversion device 11 is, for example, a power supply adapter, a power bank, and other devices.

The power supply conversion device 11 is connected to the device to be charged 12 through cables to provide electric energy for the device to be charged 12 to thereby charge a battery 122 in the device to be charged 12.

The device to be charged 12 may be, for example, a terminal or an electronic device, which may be a mobile phone, a game console, a tablet computer, an e-book reader, an intelligent wearable device, a moving picture experts group audio layer IV (MP4) player, a smart home device, an augmented reality (AR) device, a virtual reality (VR) device, and other mobile terminals, may also be rechargeable electronic devices with a charging function, such as mobile power supplies (such as power bank, travel charger), electronic cigarettes, wireless mice, wireless keyboards, wireless headsets, Bluetooth speakers, or personal computers (PCs), such as laptop computers and desktop computers.

The device to be charged 12 is connected to a charging interface 116 of the power supply conversion device 11 through a charging interface 121.

The charging interface 121 may be, for example, a female connector of a USB 2.0 interface, a Micro USB interface, or a USB TYPE-C interface. In some embodiments, the charging interface 121 may also be a female connector of a lightning interface, or any other type of parallel port or serial port that can be used for charging.

Accordingly, the charging interface 116 may be a male connector of a USB 2.0 interface, a Micro USB interface, a USB TYPE-C interface, or a lightning interface compatible with the charging interface 121.

The power supply conversion device 11 may communicate with the device to be charged 12 through the charging interface 116 and the charging interface 121, neither party needs to set additional communication interfaces or other wireless communication modules. The charging interface 116 and the charging interface 121 may be USB interfaces, the power supply conversion device 11 and the device to be charged 12 may communicate with each other based on data lines (such as D+ and/or D−lines) in the USB interfaces. Alternatively, the charging interface 116 and the charging interface 121 may be USB interfaces (such as USB TYPE-C interface) supporting the PD communication protocol, the power supply conversion device 11 and the device to be charged 12 may communicate with each other based on the PD communication protocol. In addition, the power supply conversion device 11 and the device to be charged 12 may also communicate with each other through other communication methods than the charging interface 116 and the charging interface 121. For example, the power supply conversion device 11 and the device to be charged 12 may communicate with each other in a wireless manner, such as near field communication (NFC).

Figure 3:
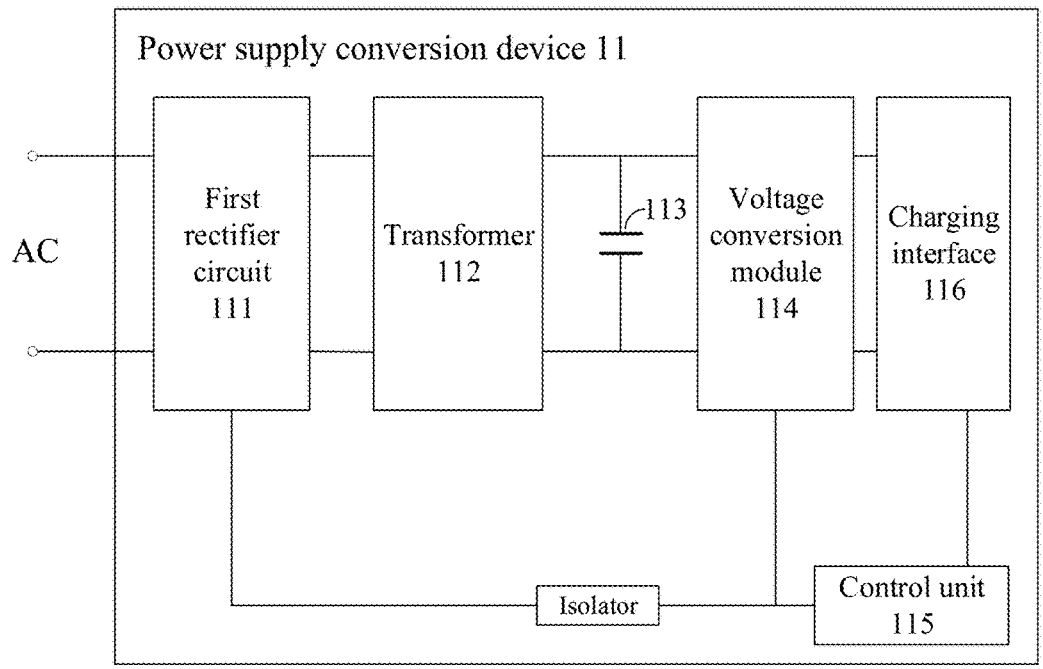
FIG. 3 illustrates a schematic structural diagram of a power supply conversion device according to an illustrative embodiment.

FIG. 3 illustrates a schematic structural diagram of a power supply conversion device according to an illustrative embodiment.

As shown in FIG. 3, the power supply conversion device 11 includes a first rectifier circuit 111, a transformer 112, a voltage conversion module 114 (also referred to as voltage conversion circuit or voltage converter), a control unit 115 (also referred to as controller), and a charging interface 116.

The first rectifier circuit 111 is located on a primary side of the transformer 112 and is used to convert an alternating current received from an AC port into a first direct current (DC). A voltage of the first DC is a first DC voltage, and the first DC voltage may be a pulsating DC voltage.

Figure 4:
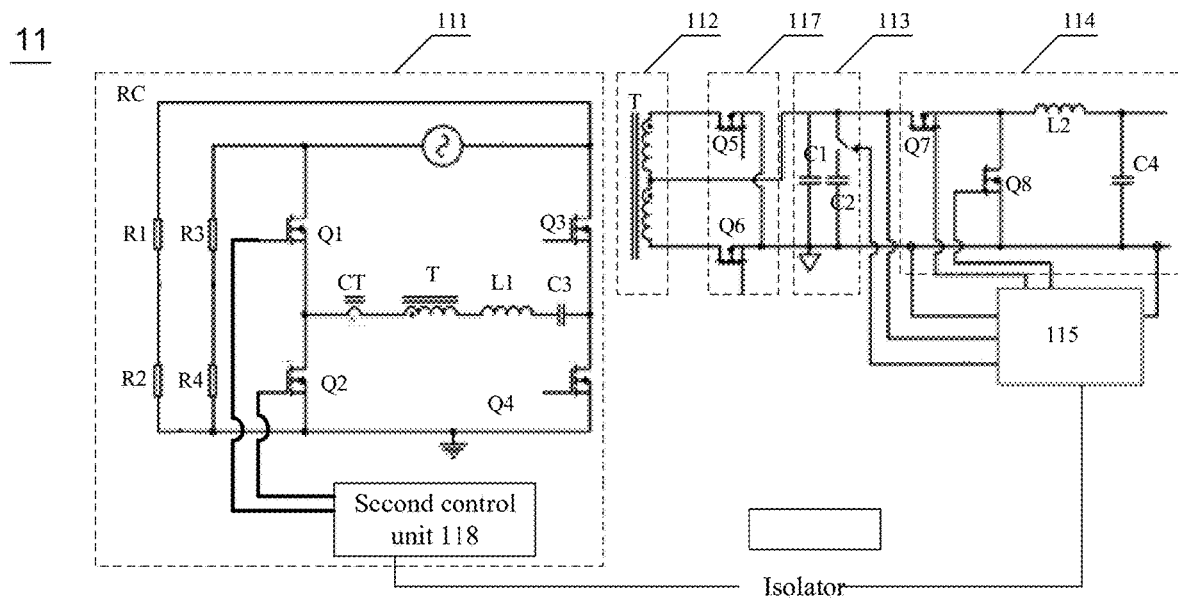
FIG. 4 illustrates a schematic structural diagram of a power supply conversion device according to another illustrative embodiment.

FIG. 4 illustrates a schematic structural diagram of a power supply conversion device shown according to another illustrative embodiment. As shown in FIG. 4, the first rectifier circuit 111 may be a bridgeless AC-DC rectifier circuit, for example.

As shown in FIG. 4, the first rectifier circuit 111 is connected to a primary winding of the transformer 112.

As shown in FIG. 3 and FIG. 4, for example, the transformer 112 may be a forward converter as shown in FIG. 4, and duty ratios of all switches in an on-state is equal and close to be 50%.

The transformer 112 is used to convert the first DC voltage into a second DC voltage, and the second DC voltage may also be a pulsating DC voltage.

The voltage conversion module 114 is located on a secondary side of the transformer 112 and is connected to a secondary winding of the transformer 112, and the voltage conversion module 114 is used to convert the second DC voltage and output a constant DC voltage or a pulsating DC voltage. The constant DC voltage refers to a voltage whose magnitude and direction do not change with time as shown in FIG. 5C. It can be understood that due to different implementation of the circuit and actual hardware conditions of the circuit, the magnitude of the voltage does not change with time and does not limit the voltage value to an absolute value, but can fluctuate slightly around a voltage value according to the actual implementation of the circuit. For example, the amplitude of the fluctuation may meet limited conditions of the charging voltage of the device to be charged. The pulsating DC voltage refers to a voltage whose direction does not change with time, but whose magnitude changes with time, as shown in FIG. 5D.

Figure 5A:
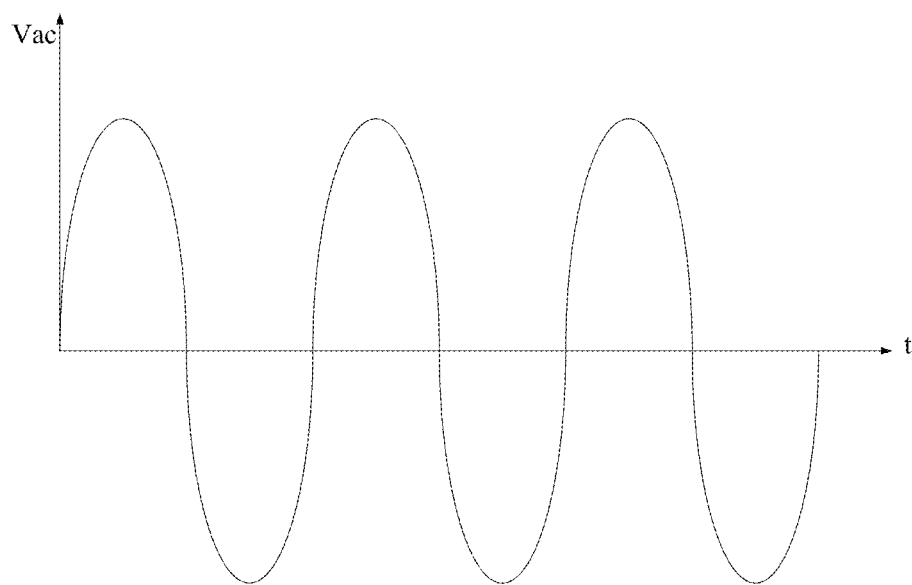
FIG. 5A illustrates a schematic waveform diagram of a voltage of an alternating current according to an illustrative embodiment.
Figure 5B:
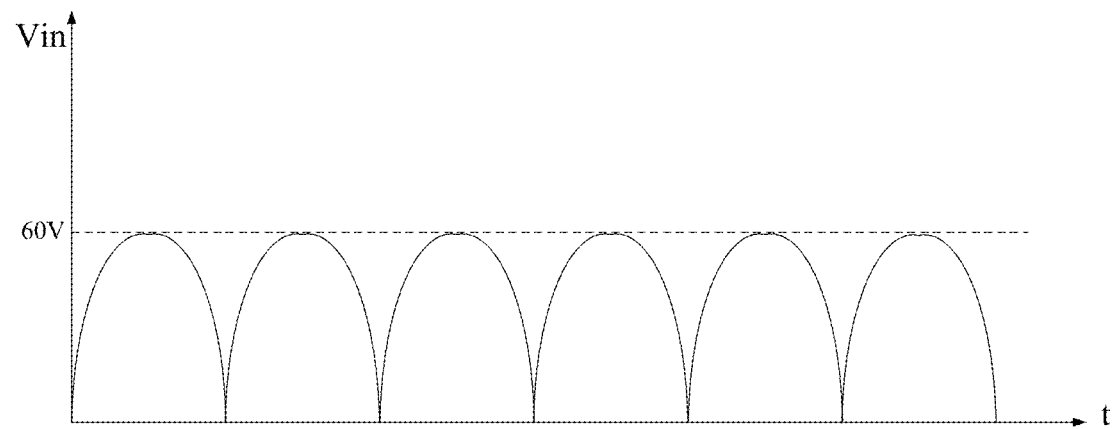
FIG. 5B illustrates a schematic waveform diagram of an input voltage of a voltage conversion module 114 according to an illustrative embodiment.
Figure 5C:
FIG. 5C illustrates a schematic waveform diagram of a constant direct-current (DC) voltage output by the voltage conversion module 114 according to an illustrative embodiment.
Figure 5D:
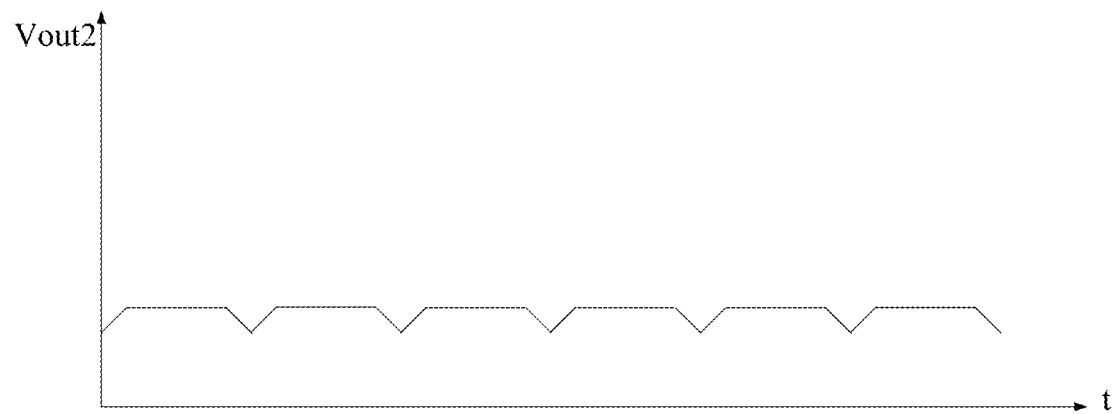
FIG. 5D illustrates a schematic waveform diagram of a second pulsating DC voltage output by the voltage conversion module 114 according to an illustrative embodiment.

FIG. 5A illustrates a schematic waveform diagram of a voltage the AC according to an illustrative embodiment, FIG. 5B illustrates a schematic waveform diagram of an input voltage of the voltage conversion module 114 according to an illustrative embodiment, FIG. 5C illustrates a schematic waveform diagram of the constant DC voltage output by the voltage conversion module 114 according to an illustrative embodiment, and FIG. 5D illustrates a schematic waveform diagram of the pulsating DC voltage output by the voltage conversion module 114 according to an illustrative embodiment.

As shown in FIG. 5A, input of the first rectifier circuit 111 takes the city power with an alternating current of 220V/50 Hz as an example, and a waveform of the voltage Vac of the alternating current is sinusoidal.

After rectification of the first rectifier circuit 111 and transformation of the transformer 112, a voltage Vin input to the voltage conversion module 114 is the pulsating DC voltage as shown in FIG. 5B (a peak voltage may be 60 V).

The voltage conversion module 114 converts the input voltage Vin and outputs a constant DC voltage Vout1 as shown in FIG. 5C or a pulsating DC voltage Vout2 as shown in FIG. 5D.

The voltage conversion module 114 may be, for example, a buck circuit, a boost circuit, a buck-boost circuit, or a charge pump circuit. The voltage conversion module 114 further bucks and transforms the pulsating DC voltage bucked through the transformer 112, and outputs a constant DC voltage or a second pulsating DC voltage.

It should be noted that the disclosure does not limit the conversion ratio of the charge pump. In practical applications, it is set according to actual needs, for example, it can be set to 1:1, 2:1, or 3:1, etc. In addition, when it is necessary to output a higher voltage, the conversion ratio of the charge pump may also be set to 1:2, or 1:3, etc. for boost operation.

The voltage conversion module 114 may also include a Cuk circuit. The Cuk circuit can realize boost operation or buck operation according to actual needs.

The control unit 115 (e.g., referred to as first controller) is connected to the first rectifier circuit and the voltage conversion module 114 (also referred to as voltage converter) individually, and used to communicate with the device to be charged 12 (such as an application processor, abbreviated as AP or other control units in the device to be charged 12) through the charging interface 116, to thereby determine a desired charging mode of the device to be charged 12.

The charging mode includes a first charging mode and a second charging mode.

The first charging mode may be, for example, the high-current fast charging mode described above. The high-current fast charging mode means that the power supply conversion device can output a relatively large current (usually greater than 2.5 amperes abbreviated as A, such as 4.5 A, 5 A, 6.5 A or even higher) or charge the battery in the charging device with a relatively large power (usually greater than or equal to 15 watts abbreviated as W).

The second charging mode may be, for example, the above high-voltage fast charging mode, such as the charging mode based on the PD protocol.

The PD protocol is one of mainstream fast charging protocols at present, which is a fast-charging specification formulated by USB-IF. PD increases power delivery through USB cables and connectors, and expands the power supply capacity of cable bus in USB applications. The PD protocol can achieve higher voltage and current, the maximum power delivery can reach 100 W, and the transmission direction of power can be changed freely.

The PD protocol has supported 100W charging since its inception (but it is not currently used on terminal devices such as smartphones), and has been developed to version 3.0. Table 1 shows charging voltage and current supported by each protocol version.

TABLE 1

| Protocol version | Voltage | Current | Power |
| --- | --- | --- | --- |
| 1.0 | 5 V | 2 A | 10 W |
| 2.0 | 5 V | 3 A | 15 W |
| 3.0 | 9 V | 3 A | 27 W |
|  | 15 V | 3 A | 45 W |

In addition, the second charging mode may also be an ordinary charging mode, for example.

The ordinary charging mode refers to that the power supply conversion device outputs a relatively small current value (usually less than 2.5 A) or charges the battery in the device to be charged with a relatively small power (usually less than 15 W). Compared with the fast-charging mode, the charging rate of the power supply conversion device in the ordinary charging mode is slower, and the charging time required to fully charge the battery with the same capacity is significantly longer.

When the control unit 115 negotiates the charging mode with the device to be charged 12, for example, the control unit 115 and the device to be charged 12 may first negotiate whether to apply the first charging mode for charging. When the power supply conversion device 11 and the device to be charged 12 both support and agree to charge in the first charging mode, they negotiate to adopt the first charging mode for charging. When the power supply conversion device 11 and the device to be charged 12 negotiate that the first charging mode cannot be used for charging, they can negotiate whether to use the second charging mode for charging. However, this disclosure is not limited to this, and it is also possible to negotiate whether to apply the second charging mode first. When it is determined through negotiation that the second charging mode will not be adopted, then negotiate whether to apply the first charging mode. In specific applications, it can be set according to actual needs.

A negotiation process of the first charging mode may be, for example, that the AP of the device to be charged identifies whether the connection port provided by the power supply conversion device is a dedicated charging port (DCP) through the BC1.2 protocol. After the AP identifies the DCP, the AP communicates with a control module of the device to be charged to notify the control module to further identify whether the charging mode of the power supply conversion device is the first charging mode. The control module may use the data cable D+/D− in the USB cables to identify whether the power supply conversion device can support the first charging mode.

The identification of the second charging mode supporting the PD protocol may be done for example by monitoring the VBUS voltage through PHY (physical layer) of the USB On-the-Go (OTG). If there is a 5 V voltage of VBUS and it is detected that the OTGID pin is a 1K pull-down resistor, it indicates that the cable supports USB PD. The USB OTG detects the adapter according to the normal BCSV1.2 specification, and starts the USB PD device policy manager. The policy manager monitors whether the frequency shift keying (FSK) signal is coupled to the DC level of VBUS, decodes the message to obtain the CapabilitiesSource message, and then obtain a list of all voltage and current pairs supported by the USB PD power supply conversion device by analyzing the message according to the USB PD protocol. The device to be charged selects a voltage and current pair from the CapabilitiesSource message according to the user's configuration, adds the voltage and current pair to the payload of the Request message, and then the policy manager couples the FSK signal to the VBUS DC level. The power supply conversion device decodes the FSK signal and sends an Accept message to the device to be charged, while adjusting the DC voltage and current output of power supply. The device to be charged receives the Accept message and adjusts the charging voltage and current of the charging management chip; so as to complete the negotiation of PD protocol.

After the control unit 115 determines the charging mode to be used through negotiation with the device to be charged 12, the control voltage conversion module 114 outputs a corresponding one of the constant DC voltage and the pulsating DC voltage according to the charging mode. For example, by controlling the first rectifier circuit to adjust the current of the AC input to the first rectifier circuit, the voltage conversion module 114 is controlled to output the corresponding one of the constant DC voltage or the pulsating DC voltage.

Under the first charging mode, the power supply conversion device 11 performs high-current fast charging for the device to be charged 12. During the high-current fast charging, the device to be charged 12 receives the charging voltage provided by the power supply conversion device 11 through the charging interface 121 and directly loads the charging voltage on both ends of the battery 122 for direct charging. If the output voltage of the power supply conversion device 11 is relatively low, the voltage of the battery 122 in the device to be charged 12 will be reversely output to the power supply conversion device 11, so that the output voltage of the power supply conversion device 11 will not be 0. Therefore, the power supply conversion device 11 can output the pulsating DC voltage to the device to be charged 12.

Under the second charging mode, according to specification requirements of the PD protocol, the power supply conversion device 11 needs to output the constant DC voltage.

Those skilled in the art should understand that when the control unit 115 located on the secondary side of the transformer communicates with the first rectifier circuit 111, because the first rectifier circuit 111 is located on the high-voltage side, it needs to be isolated accordingly to prevent the interference of the strong current side to the control unit 115 via an isolator (e.g., an optoelectronic isolator). The isolation technology of high and low voltages is well known to those skilled in the art and is not described herein in detail to avoid obscuring the disclosure.

The power supply conversion device provided by the embodiment of the disclosure, on the one hand, on the primary side of the transformer, there is no need to use large electrolytic capacitors and high-voltage resistant filter capacitors to filter the rectified pulsating DC voltage, which can reduce the size of the power supply conversion device and improve the service life and safety of the power supply conversion device. On the other hand, by adjusting the current of the AC input to the first rectifier circuit, the voltage conversion module at the secondary side of the transformer can be controlled to output the constant DC voltage or the pulsating DC voltage, so as to be compatible with charging requirements of different charging modes.

As shown in FIG. 4, the first rectifier circuit 111 includes a bridgeless AC-DC rectifier circuit RC and switching transistors Q1-Q4. By controlling the switching transistors Q1-Q4, the control unit 115 changes the input signal input to grids of the switching transistors Q1-Q4 to adjust a magnitude of the current of the AC input to the bridgeless AC-DC rectifier circuit RC, so that the voltage conversion module outputs the constant DC voltage or the pulsating DC voltage. Alternatively, the control unit 115 may also instruct the first rectifier circuit 111 to control the switching transistors to adjust the magnitude of the current of the AC input to the bridgeless AC-DC rectifier circuit RC, so that the voltage conversion module outputs the constant DC voltage or the pulsating DC voltage.

Figure 6A:
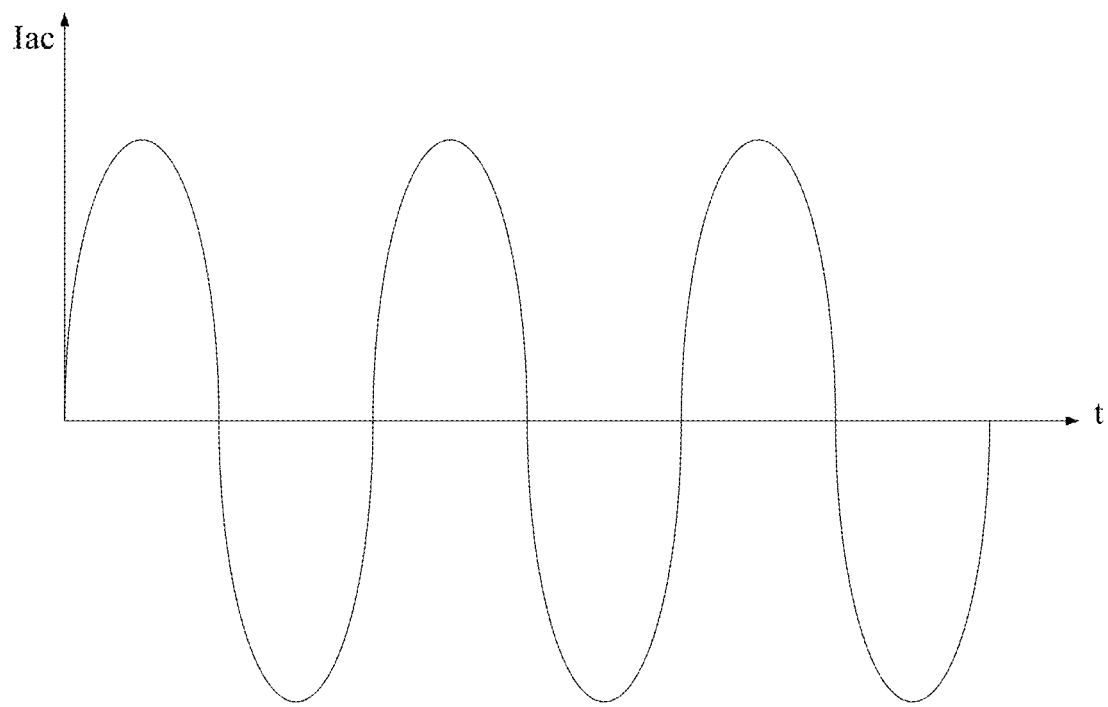
FIG. 6A illustrates a waveform diagram of a current of an alternating current according to an illustrative embodiment.

Still taking the voltage Vac of the AC shown in FIG. 5A as an example, in some embodiments, as shown in FIG. 6A, when the magnitude of the current of the AC changes with the magnitude of the voltage of the alternating current, that is, when the waveform of the current Iac of the AC is consistent with the waveform of the voltage Vac of the AC, the current is low when the input voltage is low, and the power supply conversion device 11 can obtain better power efficiency. Because the current is low when the voltage is low, and the output power is discontinuous, the output voltage of the voltage conversion module is the pulsating DC voltage.

As described above, when the power supply conversion device 11 and the device to be charged 12 adopt the first charging mode for charging, the device to be charged 12 receives the charging voltage provided by the power supply conversion device 11 through the charging interface 121, and directly loads the charging voltage on both ends of the battery 122 for direct charging. If the output voltage of the power supply conversion device 11 is relatively low, the voltage of the battery 122 in the device to be charged 12 will be reversely output to the power supply conversion device 11, so that the output voltage of the power supply conversion device 11 will not be 0. Therefore, in the first charging mode, the power supply conversion device 11 can output the pulsating DC voltage to the device to be charged 12.

Therefore, in order to improve the power efficiency of the power supply conversion device, when the charging mode negotiated between the power supply conversion device 11 and the device to be charged 12 is the first charging mode, the voltage conversion module 114 can output pulsating DC voltage. By controlling the switching transistors, the magnitude of the current of the AC input to the bridgeless AC-DC rectifier circuit RC can be adjusted to follow the change of the magnitude of the AC voltage, so that the voltage conversion module 114 outputs the pulsating DC voltage (e.g., Vout2 as shown in FIG. 5D), so that the power efficiency of the power supply conversion device 11 is better.

Figure 6B:
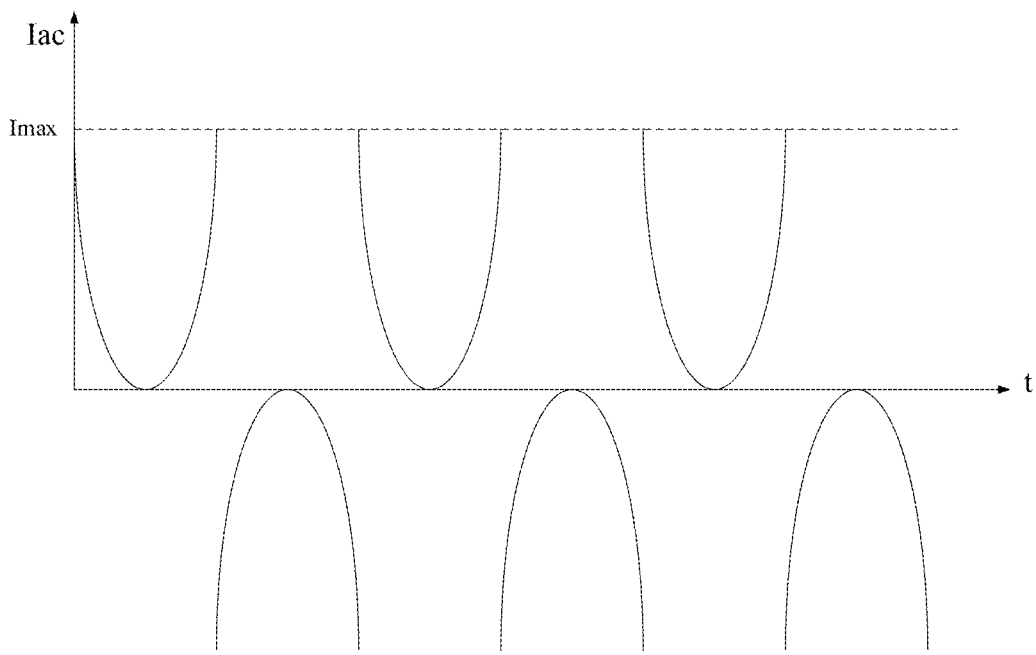
FIG. 6B illustrates a waveform diagram of a current of an alternating current according to another illustrative embodiment.

In some embodiments, when the charging mode negotiated between the power supply conversion device 11 and the device to be charged 12 is the second charging mode, as described above, the voltage conversion module 114 needs to output the constant DC voltage. In order to ensure that the output power of the power supply conversion device 11 is continuous, since power=voltage*current, when the voltage Vac is the minimum as shown in FIG. 5A, the current Iac of the AC is the maximum (Imax as shown in FIG. 6B). Therefore, in order to make the voltage conversion module 114 output the constant DC voltage, the magnitude of the current of the AC input to the bridgeless AC-DC rectifier circuit may be adjusted by controlling the switching transistors, so that the product of the AC current and the AC voltage is constant.

However, it should be noted that the larger the Imax, the lower the power efficiency of the power supply conversion device 11. Therefore, when adjusting the bridgeless AC-DC rectifier circuit, the value of Imax should be flexibly adjusted according to the current and/or voltage output by the power supply conversion device 11, so as to ensure that the power efficiency will not decrease too much when the constant DC voltage is output.

In addition, as shown in FIG. 4, the power supply conversion device 11 may further include a second control unit 118 (also referred to as second controller). The second control unit is used to communicate with the control unit 115, receive the charging mode sent by the control unit 115, control the switching transistors of the first rectifier circuit 111 based on the charging mode, and adjust the input current of the first rectifier circuit 111, so that the power supply conversion device 11 can output the pulsating DC voltage or the constant DC voltage to the device to be charged 12. In some embodiments, the second control unit 118 may be, for example, integrated into the first rectifier circuit 111.

It should be understood by those skilled in the art that the above first rectifier circuit 111 takes the bridgeless AC-DC rectifier as an example, and adjusts the input AC by controlling the switching transistors in the bridgeless AC-DC rectifier, so that the voltage conversion module 114 outputs the constant DC voltage or the pulsating DC voltage. However, the disclosure is not limited to this. The first rectifier circuit 111 may also be implemented as a bridge AC-DC rectifier, such as a full-bridge rectifier or a half-bridge rectifier, and by adding switching transistors connected to the bridge AC-DC rectifier, the AC input to the rectifier is adjusted by controlling the switching transistors, so that the voltage conversion module 114 outputs a constant DC voltage or a pulsating DC voltage.

In addition, as for the AC-DC power supply device in the related art shown in FIG. 1, when the device to be charged requires the AC-DC power supply device to provide output voltages of different voltage values, the AC-DC needs to communicate with the device to be charged through a communication chip. The device to be charged sends the required voltage to the AC-DC power supply device, the AC-DC power supply device adjusts the pulse width or frequency of the output PWM signal according to the received voltage demand, obtains the feedback voltage from the winding of the transformer, and then adjusts the pulse width or frequency of the PWM signal according to the feedback voltage, so as to obtain a stable output voltage.

Therefore, it can be seen that the control circuit used to adjust the output voltage is mainly on the primary side of the transformer, and the voltage on the primary side is relatively high, and the package of voltage resistant devices required is usually relatively large.

In the embodiment of the disclosure, the control circuit (i.e., the control unit 115) is disposed on the secondary side of the transformer of the power supply conversion device 11 for voltage conversion, the control unit 115 on the secondary side communicates with the device to be charged 12, and thus the voltage and/or current output by the power supply conversion device 11 is adjusted to the charging voltage and/or charging current expected by the device to be charged 12 through the voltage conversion module 114, thereby further reducing the use of devices and reducing the size of the power supply conversion device.

In some embodiments, the control unit 115 communicates with the device to be charged 12 through the charging interface 116, receives the feedback information sent by the device to be charged 12, and controls the voltage conversion module 114 to adjust the output voltage and/or output current of the power supply conversion device 11 according to the feedback information. The feedback information may be, for example, a desired charging voltage and/or a desired charging current for the device to be charged 12, or may be an adjustment instruction generated for the device to be charged 12 based on the desired charging voltage and/or that desired charging current.

As mentioned above, in the AC-DC power supply device shown in FIG. 1, since the voltage conversion process is on the primary side of the transformer, the feedback adjustment process based on the device to be charged is usually that the desired voltage of the device to be charged feeds back to the control chip in the AC-DC power supply device, the control chip adjusts the pulse width or frequency of PWM according to the feedback of the device to be charged, the control chip obtains the sampling voltage fed back by the transformer, and then the pulse width or frequency of PWM is further adjusted according to the sampling voltage, so as to output a stable voltage. The feedback loop is long and the real-time performance of the adjustment is poor. In addition, the device to be charged feeds back the steamed bread wave signal with small voltage amplitude, but the final requirement is to output the DC signal, the steamed bread wave is sampled to adjust the stable DC signal output, which has poor accuracy.

In the embodiment of the disclosure, the control unit 115 directly controls the voltage conversion module located on the secondary side of the transformer according to the feedback information of the device to be charged 12, so as to adjust the output voltage and/or output current of the power supply conversion device 11. On the one hand, there is no need to feed back the signal to the primary side of the transformer (i.e., the high-voltage side) through the secondary side of the transformer, which saves the optical coupler and other devices for feedback signal transmission and reduces a feedback transmission path, and improves the real-time performance of feedback. On the other hand, based on the feedback information, the voltage conversion module on the secondary side of the transformer is directly controlled to adjust the output of the constant DC voltage, which has high adjustment accuracy.

In some embodiments, as shown in FIG. 3, the power supply conversion device 11 may further include an input capacitor 113 connected in parallel between the secondary winding of the transformer 112 and the voltage conversion module 114. The input capacitor 113 may be film capacitor, ceramic capacitor, or the like, and has a small size because it is located on the secondary side of the transformer. The input capacitor 113 can prevent the pulsating DC voltage input to the voltage converting module 114 from being too low, thereby ensuring the normal operation of the voltage converting module 114. As shown in FIG. 4, the input capacitor 113 may include capacitors C1 and C2 connected in parallel. Among them, the capacitor C2 may be connected to a switch, the magnitude of capacitance of the input capacitor 113 may be adjusted by controlling on and off of the switch, so that the minimum working voltage used to ensure the normal operation of the voltage conversion module 114 may be adjusted.

The power supply conversion device 11 may further include a second rectifier circuit 117, the second rectifier circuit may be implemented as switching transistors Q5 and Q6 as shown in FIG. 4, and the switching transistors Q5 and Q6 are connected to the secondary winding of the transformer 112 and used to rectify the pulsating DC voltage output by the transformer 112.

The following are embodiments of a charging control method of the disclosure, which can be applied to the embodiment of the power supply conversion device of the disclosure. For details not disclosed in the embodiments of the method of the disclosure, please refer to the embodiments of the power supply conversion device of the disclosure.

Figure 7:
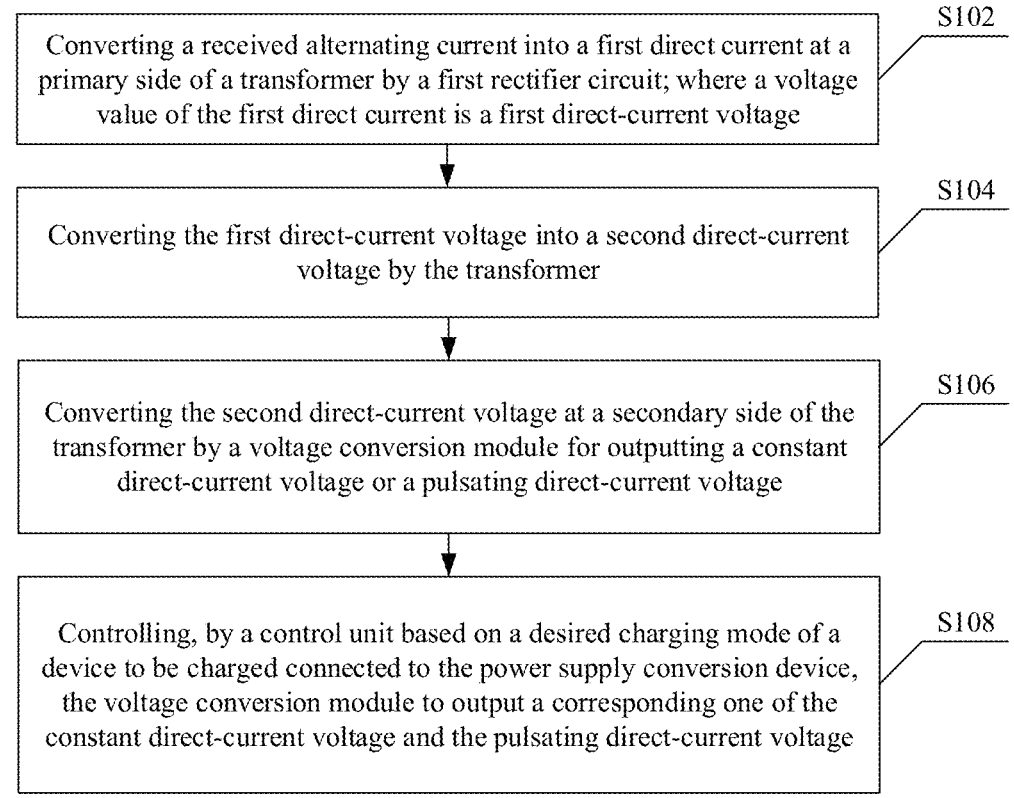
FIG. 7 illustrates a schematic flowchart of a charging control method according to an illustrative embodiment.

FIG. 7 illustrates a schematic flowchart of a charging control method according to an illustrative embodiment. The charging control method can be applied to the power supply conversion device 11 described above.

As shown in FIG. 7, the charging control method 10 includes bocks S102 through S108 as follows.

At the block S102, converting a received AC into a first DC at the primary side of the transformer by the first rectifier circuit.

Among them, a voltage of the first DC is a first DC voltage.

At the block S104, converting the first DC voltage into a second DC voltage by the transformer.

At the block S106, converting the second DC voltage by the voltage conversion module for outputting a constant DC voltage or a pulsating DC voltage at the secondary side of the transformer.

At the block S108, controlling, by the control unit based on a desired charging mode of the device to be charged connected to the power supply conversion device, the voltage conversion module to output a corresponding one of the constant DC voltage and the pulsating DC voltage.

In some embodiments, the block S108 may further include: determining the desired charging mode by the control unit, and controlling, based on the desired charging mode, the first rectifier circuit to adjust a current of the AC input to the first rectifier circuit and thereby control the voltage conversion module to output the corresponding one of the constant DC voltage and the pulsating DC voltage.

The charging control method provided by the embodiment of the disclosure, on the one hand, on the primary side of the transformer, there is no need to use large electrolytic capacitors and high-voltage resistant filter capacitors to filter the rectified pulsating DC voltage, which can reduce the size of the power supply conversion device and improve the service life and safety of the power supply conversion device. On the other hand, by adjusting the current of the AC input to the first rectifier circuit, the voltage conversion module at the secondary side of the transformer can be controlled to output the constant DC voltage or the pulsating DC voltage, so as to be compatible with charging requirements of different charging modes.

In some embodiments, according to the charging mode, the controlling, based on the desired charging mode, the first rectifier circuit to adjust a current of the AC input to the first rectifier circuit and thereby control the voltage conversion module to output the corresponding one of the constant DC voltage and the pulsating DC voltage in the block S108 above may further include: controlling switching transistors in the first rectifier circuit to adjust the current of the AC input to a bridgeless AC-DC rectifier circuit in the first rectifier circuit, to thereby make the voltage conversion module output the constant DC voltage or the pulsating DC voltage; or instructing, by the control unit, the first rectifier circuit to control the switching transistors to adjust the current of the AC input to the bridgeless AC-DC rectifier circuit, to thereby make the voltage conversion module output the corresponding one of the constant DC voltage and the pulsating DC voltage.

For example, by controlling the switching transistors, a magnitude of the AC input to the bridgeless AC-DC rectifier circuit is adjusted following a change of a magnitude of an AC voltage, so that the voltage conversion module outputs the pulsating DC voltage.

For another example, by controlling the switching transistors, a magnitude of the current of the AC input to the bridgeless AC-DC rectifier circuit is adjusted while making a product of the current of the AC and a voltage of the AC be constant, so that the voltage conversion module outputs the constant DC voltage.

Figure 8:
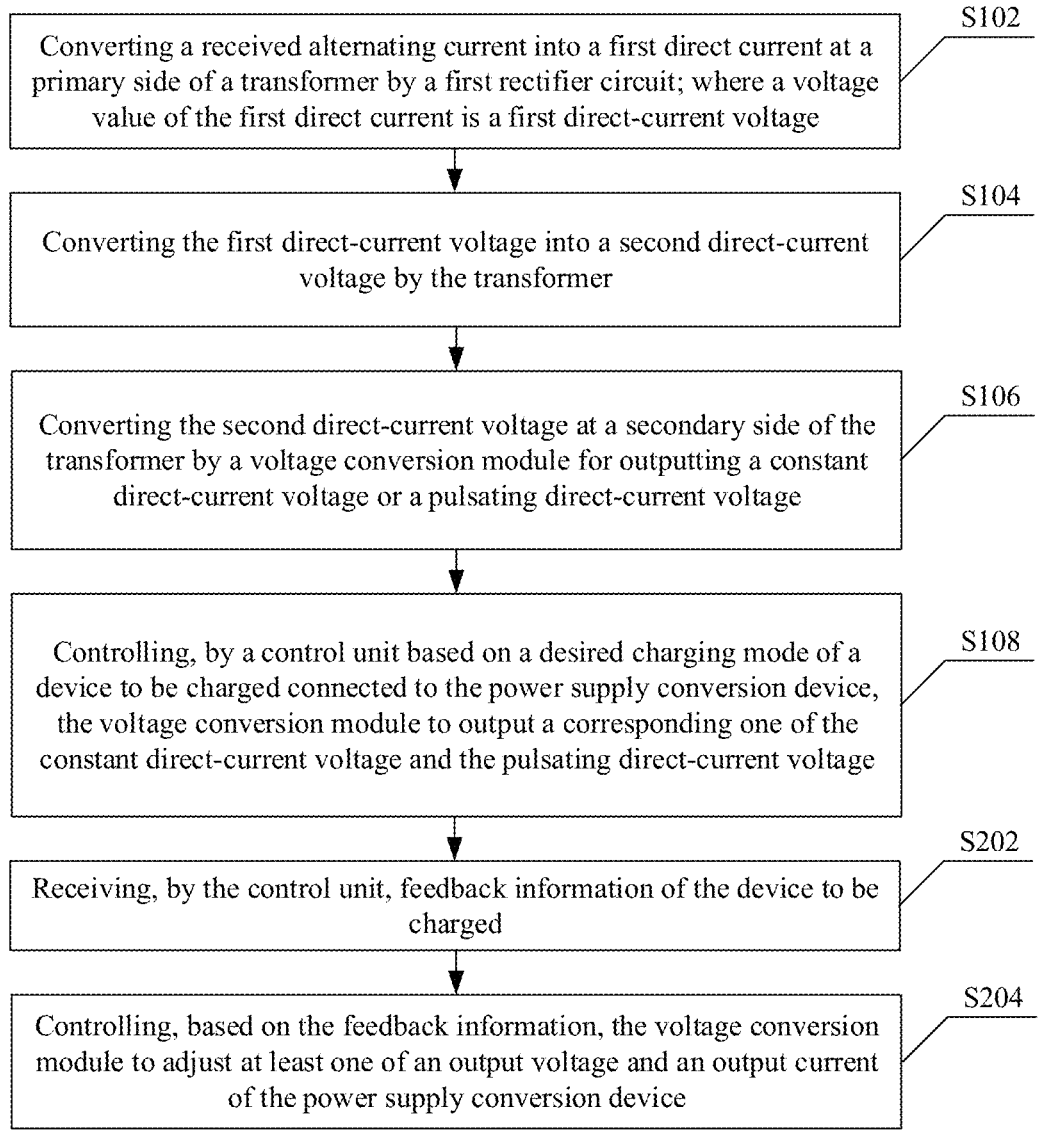
FIG. 8 illustrates a schematic flowchart of a charging control method according to another illustrative embodiment.

FIG. 8 illustrates a schematic flowchart of another charging control method according to another illustrative embodiment. The charging control method may be applied to the power supply conversion device 11 described above. Different from the charging control method 10 shown in FIG. 7, the charging control method 20 shown in FIG. 8 may further include blocks S202 through S204 as follows.

At the block S202, receiving, by the control unit, feedback information of the device to be charged.

In some embodiments, the feedback information includes: at least one of a desired charging voltage value and a desired charging current value of the device to be charged, or includes an adjustment instruction generated by the device to be charged based on the at least one of the desired charging voltage value and the desired charging current value.

At the block S204, controlling, based on the feedback information, the voltage conversion module to adjust at least one of an output voltage and an output current of the power supply conversion device.

In the charging control method provided by the embodiment of the disclosure, the voltage conversion module located on the secondary side of the transformer is directly controlled based on the feedback information of the device to be charged, so as to adjust the output voltage and/or output current of the power supply conversion device. On the one hand, there is no need to feed back the signal to the primary side (i.e., high-voltage side) of the transformer through the secondary side of the transformer, which saves an optical coupler and other devices for feedback signal transmission, reduces the feedback transmission path, and improves the real-time performance of feedback. On the other hand, based on the feedback information, the voltage conversion module at the secondary side of the transformer is directly controlled to adjust the output of constant DC voltage, which has high adjustment accuracy.

It should be noted that the above drawings are only schematic illustrations of the processes involved in the method according to the illustrative embodiments of the disclosure, and are not intended to limit the disclosure. It is readily understood that the processes shown in the above drawings do not imply or limit a chronological order of these processes. In addition, it is readily understood that these processes may be performed, for example, in multiple modules either synchronously or asynchronously.

The above description has specifically shown and described illustrative embodiments of the disclosure. It should be understood that the disclosure is not limited to the detailed structures, arrangements, or implementation methods described herein; rather, the disclosure is intended to cover various modifications and equivalent arrangements included within the spirit and scope of the appended claims.

What is claimed is:

1. A power supply conversion device, comprising:
a transformer;
a first rectifier circuit, connected to a primary winding of the transformer and configured to convert a received alternating current into a first direct current, wherein a voltage value of the first direct current is a first direct-current voltage, and the transformer is configured to convert the first direct-current voltage into a second direct-current voltage;
a voltage converter, connected to a secondary winding of the transformer and configured to convert the second direct-current voltage and output a constant direct-current voltage or a pulsating direct-current voltage;
an input capacitor, connected between the secondary winding of the transformer and the voltage converter in parallel, wherein the input capacitor comprises two capacitors connected in parallel, one of the two capaci-
tors is connected to a switch, and the switch is configured to be controlled to be on or off to thereby adjust a capacitance of the input capacitor; and
a controller, connected to the first rectifier circuit and the voltage converter individually, and configured to control, based on a desired charging mode of a device to be charged connected to the power supply conversion device, the voltage converter to output a corresponding one of the constant direct-current voltage and the pulsating direct-current voltage.

2. The power supply conversion device according to claim 1, wherein the controller is specifically configured to determine the desired charging mode, and adjust a current of the alternating current input to the first rectifier circuit based on the desired charging mode to thereby control the voltage converter to output the corresponding one of the constant direct-current voltage and the pulsating direct-current voltage.

3. The power supply conversion device according to claim 1, wherein the first rectifier circuit comprises: a bridgeless alternating current to direct-current (AC-DC) rectifier circuit and switching transistors; and
wherein the controller is configured to control the switching transistors to adjust a current of the alternating current input to the bridgeless AC-DC rectifier circuit and thereby control the voltage converter to output the corresponding one of the constant direct-current voltage and the pulsating direct-current voltage; or the controller is configured to instruct the first rectifier circuit to control the switching transistors to adjust the current of the alternating current input to the bridgeless AC-DC rectifier circuit and thereby control the voltage converter to output the corresponding one of the constant direct-current voltage and the pulsating direct-current voltage.

4. The power supply conversion device according to claim 3, wherein the controller is specifically configured to:
control the switching transistors to adjust a magnitude of the current of the alternating current following a change of a magnitude of a voltage of the alternating current and thereby control the voltage converter to output the pulsating direct-current voltage.

5. The power supply conversion device according to claim 3, wherein the controller is specifically configured to:
control the switching transistors to adjust a magnitude of the current of the alternating current while making a product of the current of the alternating current and a voltage of the alternating current be constant and thereby control the voltage converter to output the constant direct-current voltage.

6. The power supply conversion device according to claim 1, wherein the transformer comprises a forward transformer.

7. The power supply conversion device according to claim 1, wherein the controller is further configured to receive feedback information of the device to be charged, and control the voltage converter to adjust at least one of an output voltage and an output current of the power supply conversion device based on the feedback information.

8. The power supply conversion device according to claim 7, wherein the feedback information comprises at least one of a desired charging voltage value and a desired charging current value of the device to be charged, or comprises an adjustment instruction generated by the device to be charged based on the at least one of the desired charging voltage value and the desired charging current value.

9. The power supply conversion device according to claim 1, further comprising:

a second rectifier circuit, connected between the secondary winding and the voltage converter and configured to rectify the second direct-current voltage.

10. The power supply conversion device according to claim 1, wherein the voltage converter is further configured to:
output the pulsating direct-current voltage in response to the desired charging mode being a first charging mode; and
output the constant direct-current voltage in response to the desired charging mode being a second charging mode;
wherein the first charging mode is a high-current charging mode, and the second charging mode is one of a high-voltage charging mode and an ordinary charging mode.

11. The power supply conversion device according to claim 1, wherein the voltage converter comprises at least one selected from a group consisting of a buck circuit, a boost circuit, a buck/boost circuit, a charge pump, and a Cuk circuit.

12. A charging control method, applied to a power supply conversion device, wherein the method comprises:
converting a received alternating current into a first direct current at a primary side of a transformer of the power supply conversion device by a first rectifier circuit of the power supply conversion device, wherein a voltage value of the first direct current is a first direct-current voltage;
converting the first direct-current voltage into a second direct-current voltage by the transformer;
converting the second direct-current voltage at a secondary side of the transformer by a voltage converter of the power supply conversion device for outputting a constant direct-current voltage or a pulsating direct-current voltage;
determining, by a controller of the power supply conversion device, a desired charging mode of a device to be charged connected to the power supply conversion device; and
controlling, by a controller based on the desired charging mode, the first rectifier circuit to adjust a current of the alternating current input to the first rectifier circuit and thereby control the voltage converter to output a corresponding one of the constant direct-current voltage and the pulsating direct-current voltage;
wherein the power supply device further comprises an input capacitor connected between a secondary winding of the transformer and the voltage converter in parallel, the input capacitor comprises two capacitors connected in parallel, one of the two capacitors is connected to a switch, and the method further comprises:
controlling the switch to be on or off to adjust a capacitance of the input capacitor.

13. The method according to claim 12, wherein the controlling, by the controller based on the desired charging mode, the first rectifier circuit to adjust a current of the alternating current input to the first rectifier circuit and thereby control the voltage converter to output the corresponding one of the constant direct-current voltage and the pulsating direct-current voltage comprises:
controlling switching transistors in the first rectifier circuit to adjust a current of the alternating current input to a bridgeless AC-DC rectifier circuit in the first rectifier circuit and thereby make the voltage converter output the corresponding one of the constant direct-current voltage and the pulsating direct-current voltage, specifically comprising:
controlling the switching transistors to adjust a magnitude of the current of the alternating current following a change of a magnitude of a voltage of the alternating current and thereby control the voltage converter to output the pulsating direct-current voltage, or controlling the switching transistors to adjust a magnitude of the current of the alternating current while making a product of the current of the alternating current and a voltage of the alternating current be constant and thereby control the voltage converter to output the constant direct-current voltage; or
instructing, by the controller, the first rectifier circuit to control the switching transistors to adjust the current of the alternating current input to the bridgeless AC-DC rectifier circuit and thereby make the voltage converter output the corresponding one of the constant direct-current voltage and the pulsating direct-current voltage.

14. The method according to claim 12, further comprising:
receiving, by the controller, feedback information of the device to be charged; and
controlling, based on the feedback information, the voltage converter to adjust at least one of an output voltage and an output current of the power supply conversion device.

15. The method according to claim 14, wherein the feedback information comprises: at least one of a desired charging voltage value and a desired charging current value of the device to be charged, or comprises an adjustment instruction generated by the device to be charged based on the at least one of the desired charging voltage value and the desired charging current value.

16. A power supply conversion device, comprising:
a transformer;
a first rectifier circuit, connected to a primary winding of the transformer and configured to convert a received alternating current into a first direct current, wherein a voltage value of the first direct current is a first direct-current voltage, and the transformer is configured to convert the first direct-current voltage into a second direct-current voltage;
a voltage converter, connected to a secondary winding of the transformer and configured to convert the second direct-current voltage and selectably output a constant direct-current voltage or a pulsating direct-current voltage;
a charging interface, connected to the voltage converter and configured to match a corresponding charging interface of a device to be charged connected to the power supply conversion device;
a first controller, connected to the first rectifier circuit and the voltage converter individually, and configured to communicate with the device to be charged through the charging interface to determine a desired charging mode of the device to charged, and control, based on the desired charging mode of the device to be charged, the first rectifier circuit to adjust a current of the alternating current input to the first rectifier circuit and thereby control the voltage converter to output a corresponding one of the the constant direct-current voltage and the pulsating direct-current voltage;
a second rectifier circuit, connected between the secondary winding and the voltage converter and configured to rectify the second direct-current voltage; and an input capacitor, connected between the second rectifier circuit and the voltage converter in parallel, wherein the input capacitor comprises two capacitors connected in parallel, one of the two capacitors is connected to a switch, and the switch is configured to be controlled to be on or off to thereby adjust a capacitance of the input capacitor.

17. The power supply conversion device according to claim 16, wherein the first rectifier circuit is a bridgeless AC-DC rectifier circuit and comprises:

switching transistors; and a second controller, configured to communicate with the first controller through an isolator, receive the desired charging mode sent by the first controller, control the switching transistors based on the desired charging mode, and adjust an input current of the first rectifier circuit.

18. The power supply conversion device according to claim 16, wherein the first controller is specifically configured to:

control switching transistors in the first rectifier circuit to adjust a magnitude of the current of the alternating current to follow a change of a magnitude of a voltage of the alternating current and thereby control the voltage converter to output the pulsating direct-current voltage; or control the switching transistors to adjust the magnitude of the current of the alternating current while making a product of the current of the alternating current and the voltage of the alternating current be constant and thereby control the voltage converter to output the constant direct-current voltage.

\* \* \* \* \*